Aug. 21, 1962          C. J. KORANDA ETAL                3,050,342
                 PNEUMATIC UNLOADING HOPPER STRUCTURE
Filed May 9, 1960                                     2 Sheets-Sheet 1
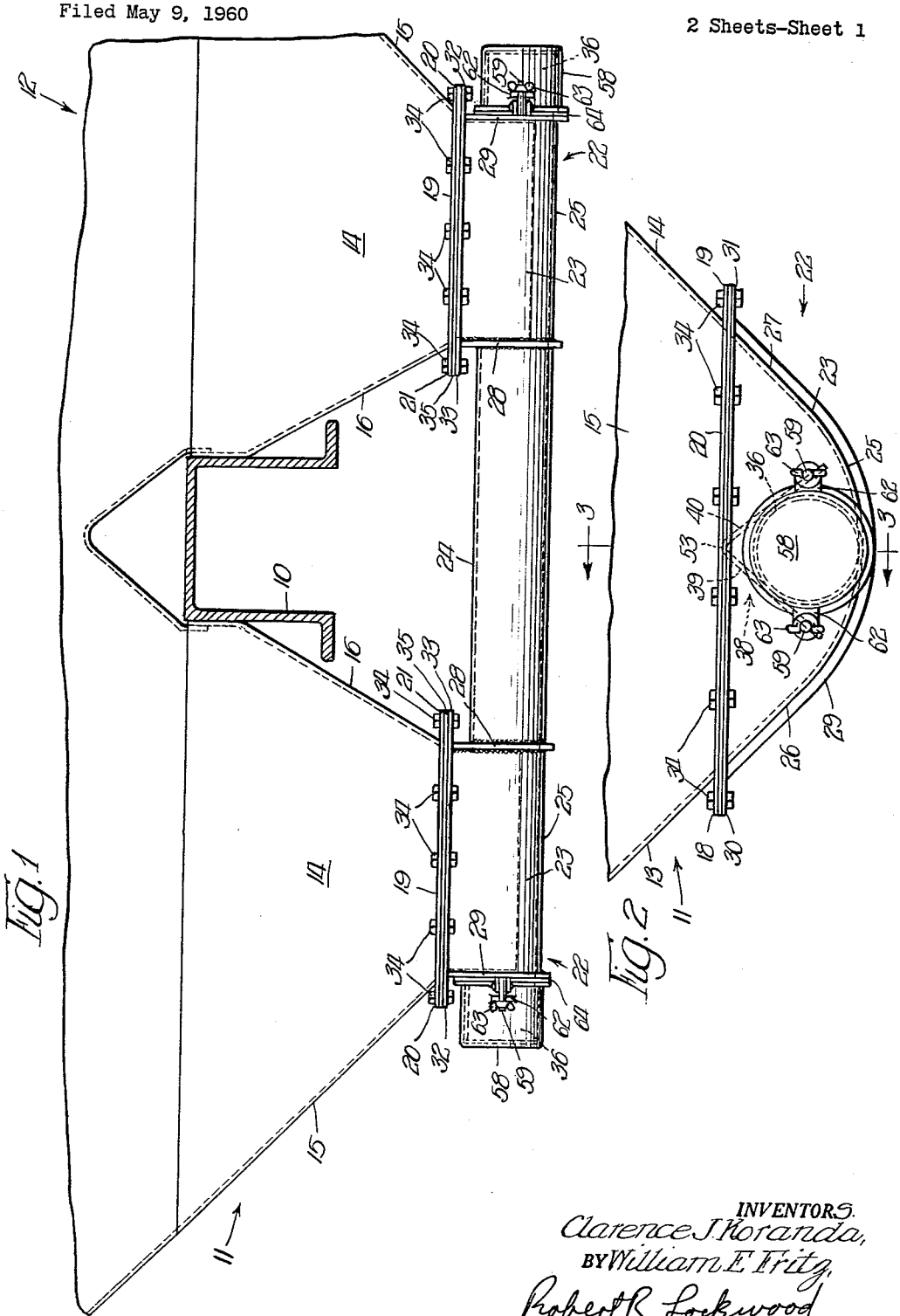
INVENTORS.
Clarence J. Koranda,
BY William E. Fritz,
Robert R. Lockwood
ATT'Y Aug. 21, 1962   C. J. KORANDA ETAL   3,050,342
PNEUMATIC UNLOADING HOPPER STRUCTURE
Filed May 9, 1960   2 Sheets-Sheet 2
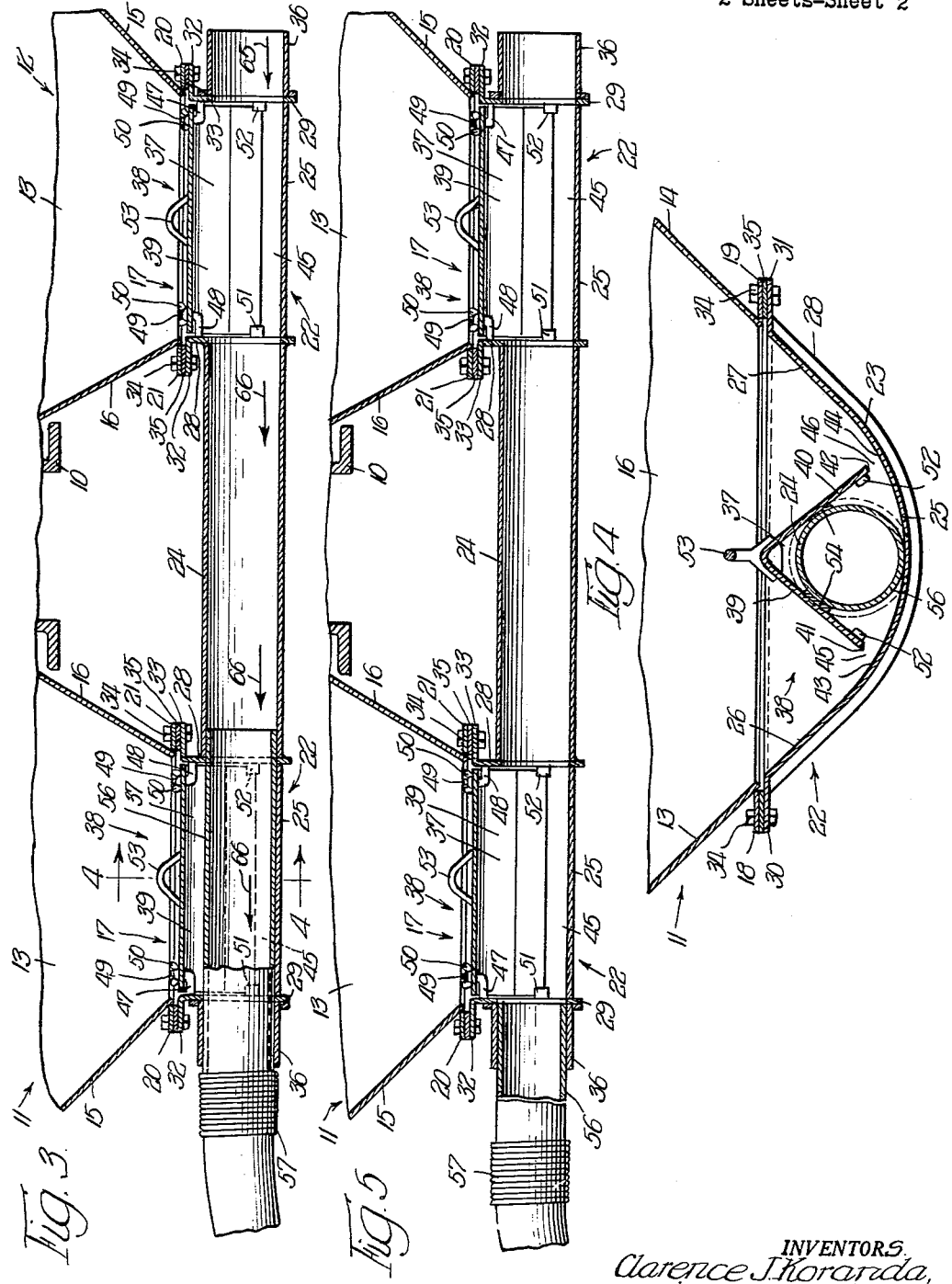
INVENTORS
Clarence J. Koranda,
BY William E. Fritz,
Robert R. Lockwood
Atty.

United States Patent Office 3,050,342
Patented Aug. 21, 1962

3,050,342
PNEUMATIC UNLOADING HOPPER STRUCTURE
Clarence J. Koranda, Western Springs, and William E. Fritz, Hinsdale, Ill., assignors to Enterprise Railway Equipment Company, Chicago, Ill., a corporation of Illinois
Filed May 9, 1960, Ser. No. 27,660
8 Claims. (Cl. 302—52)

This invention relates to an improved pneumatic unloading structure having provision for selectively withdrawing lading pneumatically from any single unit of a plurality of interconnected hoppers. This application is a continuation-in-part of our pending application Serial No. 11,648, filed February 29, 1960, and assigned to the assignee of this application.

This improvement is of special importance in connection with transversely spaced and aligned hoppers normally discharging into vacuum chambers which are interconnected by conduit means. In the operation of pneumatically unloading hoppers interconnected by conduit means it is desirable, for best results, that provision be made for independent unloading of the hoppers. To this end provision is made for confining suction to one hopper and isolating other hoppers in the connected system.

Various expedients have been suggested for accomplishing the desired result. They involve the use of valves or similar mechanical contrivances for blocking off the flow of lading to provide selectivity of unloading. Such devices are necessarily complicated and, furthermore, are liable to clog. They present cleaning difficulties also.

This invention contemplates an arrangement of hoppers interconnected by a conduit system and arranged for receiving a hollow suction tube of extended length and in close fitting relation with the interior of the conduit system. Using this arrangement the tube may be moved axially to seal the opening of one of the hoppers while withdrawal of lading is effected from the other companion hopper.

Among the objects of the invention are: To provide a hopper construction arranged to accommodate an axially movable suction tube for selectively pneumatically unloading any one of a series of interconnected hoppers; to provide for holding and centering a suction tube within the confines of a conduit system; to provide a structure which will accommodate a suction tube in such a manner as to seal off the flow of lading from certain of the hopper units of a series of interconnected hoppers whereby flow of lading is confined to only one unit of the series at one time; to provide interconnected hoppers arranged to present lower floor portions of arcuate shape forming a rest or support for a suction tube; to provide hoppers having interconnected vacuum chambers formed, in part, by the lowermost portion of the hopper floor and the side walls of hood shaped members with the parts so related as to present an interior configuration to accommodate therein a circularly shaped suction tube with the floor forming a support for the tube and the walls of the hood overlying the tube in close adjacency thereto.

Railway cars and vehicles for transporting commodities in bulk are widely used for handling different types of lading. When changing from one type of commodity to another it is essential that the vehicle be thoroughly cleaned and all traces of lading removed. For this reason it is desirable that the interior of the hoppers, and such parts as come in contact with lading, be free from ledges.

It is, therefore, another object of this invention to provide hoppers which discharge lading into vacuum chambers interconnected by a suction conduit and to arrange the parts in such a manner that the conventional sealing devices now employed for isolating the hoppers from each other may be dispensed with and selectivity of discharge effected through the medium of a removable suction tube.

The invention further resides in certain details of construction and refinement of parts associated with this improvement.

For a more complete understanding of the nature and scope of this invention reference may be had to the following detailed description, taken together with the accompanying drawings, in which:

FIG. 1 is a vertical section view through the lower portion of a pair of aligned hoppers mounted on opposite sides of the longitudinally extending center sill of a railway car.

FIG. 2 is a side elevational view of a portion of the hopper structure shown in FIG. 1, as viewed from left to right.

FIG. 3 is a view, partly in elevation, and principally in vertical longitudinal section, taken generally on line 3—3 of FIG. 2, showing the suction tube in position isolating the near hopper.

FIG. 4 is a transverse vertical sectional view taken on a line 4—4 of FIG. 3.

FIG. 5 is a view, similar to FIG. 3, showing the suction tube in position for withdrawal of lading from the near hopper.

Referring now to the drawings, wherein the improvement is shown as applied to a railway car having a longitudinally extending center sill 10 and hoppers 11 and 12 on opposite sides thereof. The hoppers 11 and 12 are disposed in transversely aligned relation with respect to the longitudinal axis of the railway car. Only one pair of such transversely aligned hoppers 11 and 12 is shown. It will be understood, however, that a series of pairs of such hoppers is usually employed for each vehicle or railway car.

Inasmuch as the hoppers on opposite sides of the center sill 11 are of similar construction the description herein is applicable to both such hoppers. The hopper 11 is formed by inclined sheets 13 and 14, FIGS. 2 and 4, which meet with outer and inner sheets 15 and 16 to form the upper section of a four sided load containing hopper. The sheets 13, 14, 15 and 16 terminate to form a rectangular discharge area 17. The lower margins of these sheets are reinforced by laterally outwardly extending flanges indicated at 18, 19, 20 and 21. The flanges 18 to 21, inclusive, thus form an outstanding ledge around sides of each hopper 11 and 12 having a downwardly facing surface for detachably receiving a lower hopper structure 22.

The lower hopper structure 22 is located below the level of the center sill 10 and generally includes a basin structure 23 united by a tubular shaped conduit section 24 with the basin structure 23 underneath the hopper 12. The structure 22 is of generally depressed shaped lower formation, as indicated at 25, in substantially aligned relation with the lower portion of the tubular shaped section 24 so as to provide a continuation of the lowermost inner surface thereof. Leading outwardly and upwardly from the arcuate shaped portion 25 are inclined walls 26 and 27 which, in effect, are extensions of sheets 13 and 14.

At the ends of the structure 22 there are substantially vertically disposed inner and outer end walls as indicated at 28 and 29. The upper margins of the walls 26, 27, 28 and 29 are provided with laterally extending flanges 30, 31, 32 and 33 which are located respectively to underlie the flanges 18, 19, 20 and 21. The laterally extending flanges of the hopper 11 or 12 and of the lower hopper structure 22 constitute wall means for receiving attaching rivets or bolts 34 for holding the latter in place underneath the former. There is interposed a resilient gasket 35 between respective upper and lower sections. If desired, the walls 26, 27, 28 and 29 can form integral extensions of the hopper sheets 13, 14, 16 and 15 respectively, as by being welded thereto. In that event, the flanges 18, 19, 20 and 21 and 30, 31, 32 and 33 would be dispensed with.

The outer end walls 29 of the lower hopper structures 22 are provided with tubular shaped nozzle extensions 36 which are disposed in alignment with the tubular shaped connecting conduit sections 24. The respective sections 36—36 and the interconnecting conduit section 24 are preferably of similar size and shape and, being disposed in alignment, constitute extensions of each other.

The arcuate shaped basin structure 23 forms the lower part of a vacuum chamber 37 at the lowermost part of the hopper structure 22. The upper portion of the vacuum chamber 37 is formed by a generally inverted U-shaped or V-shaped hood 38. The hood 38 has inclined opposite sloping sides 39 and 40 which are preferably tangentially related to the outer periphery of the conduit sections 24 or the nozzle extensions 36, if extended. The sides 39 and 40 are of symmetrical construction and the hood 38 is positioned within the confines of the U-shaped bottom member 22 so that the lower edge portions 41 and 42 are spaced from the juxtaposed upper surfaces 43 and 44 of the inclined walls 26 and 27 to provide openings 45 and 46. It will be noted that the openings 45 and 46 serve to interconnect the hoppers 11 and 12 with a conduit formed by the endwise related nozzle extensions 36, vacuum chambers 37 and interconnecting conduit section 24.

The openings 45 and 46 permit gravity flow of lading from the lower hopper structure 22 to within the vacuum chamber 37. It is a feature of this invention to allow the lading normally to flow through the openings 45 and 46 into each vacuum chamber 37 and thus dispense with the conventional types of valves or closures for these openings in combination with the provision of the interconnecting conduit section 24 between the lower hopper structure 22.

With a view to permitting access to the upper surfaces of the bottom member 22 for cleaning and inspection, the hood 38 is preferably removably mounted. For this purpose brackets 47 and 48 are suitable secured to the end closure sheets 28 and 29 and extend inwardly therefrom. Threaded studs 49 extend upwardly from the support brackets 47 and 48 and the wing nuts 50 thereon serve to hold the hood 38 in place. The hood 38 is further supported by brackets 51 and 52 on the end of the walls 28 and 29. A handle 53 is secured to the upper part of each hood 38 to facilitate removing and replacing it. Guiding pads 54, which are secured to the undersides of the sloping walls 39 and 40 of the hood 38, are disposed to contact tangentially the periphery of a removable suction tube 56 as best seen by reference to FIG. 4. The suction tube 56 closely interfits with one or the other of the ends of the interconnecting conduit section 24 and likewise with the respective nozzle extension 36. It is connected by a flexible hose 57 to a suitable vacuum source of a pneumatic conveying system.

Each end of each nozzle extension 36 is enclosed by a cup shaped cap 58 which is there retained by means of screw-threaded swinging bolts 59 that are pivotally mounted at 60 on brackets 61. The bolts 59 are swung to engage with open sides lugs 62 on the sides of each cap 58. Wing nuts 63 engage with the screw threaded portion of the swinging bolts 59 to force each cap 58 tightly closed and into engagement with a resilient gasket 64.

The operation and advantages of the improvement may be best understood by reference to FIGS. 3 and 5. Referring to FIG. 3 the unloading operation is effected as follows: Assuming that hoppers 11 and 12 are full of lading and that hopper 12 is to be unloaded first, the caps 58 are removed. The suction tube 56 at the end of the flexible hose 57 is inserted with suction applied into the nozzle extension 36 of the hopper 11 a sufficient distance to cover completely the openings 45 and 46 of the related vacuum chamber 37. As shown, it extends slightly into the adjacent end of the interconnecting conduit section 24. The suction is then directly effective to unload hopper 12 to the exclusion of hopper 11. As indicated by the arrow 65, air enters the nozzle extension 36. It entrains lading flowing by gravity into the vacuum chamber 37 through the openings 45 and 46. Air and lading then flow, as indicated by the arrows 66, from the vacuum chamber 37 through the interconnecting conduit section 24, suction tube 56 and flexible hose 57 to a storage bin (not shown) or other receptacle.

Upon completion of the unloading operation of hopper 12, the suction tube 56 is moved axially outwardly a sufficient distance to uncover openings 45 and 46 of the vacuum chamber of hopper 11, as seen in FIG. 5. Suction is then effective to unload hopper 11. Air then enters from hopper 12 and its nozzle extension 36 to entrain lading flowing by gravity through the openings 45 and 46 into the vacuum chamber 37 for discharge through the suction tube 56 and flexible hose 57.

Hopper 11 can be unloaded first, either by inserting the suction tube 56 underneath the hopper 12 or by inserting it to the extent indicated in FIG. 5. If the latter is followed, when hopper 11 is empty, the suction tube 56 is inserted, as shown in FIG. 3 to close off the empty hopper and unload pneumatically hopper 12. With both hoppers 11 and 12 full, when the suction tube 56 is inserted as shown in FIG. 5, hopper 11 will be unloaded first because the greatest pressure differential is at the point closest to the entrance to the suction tube 56. As a result hopper 11 is first unloaded and then, by further inserting the suction tube 56 to the extent indicated in FIG. 3, hopper 11 is closed off and hopper 12 is unloaded.

What is claimed as new is:

1. In combination, a pair of load containing railway car hoppers adapted for pneumatic unloading, said hoppers being disposed in transversely aligned relation; a conduit interconnecting the hoppers; means providing openings from the hoppers to the conduit normally open to allow lading to flow by gravity into the conduit; and means for selectively withdrawing lading from one of the hoppers to the exclusion of the other including a suction tube having a length sufficient to span the opening of only one of said hoppers to block the opening of the excluded hopper while permitting the withdrawal therethrough of lading from the companion hopper through its opening, and means on each hopper for receiving said suction tube for such endwise movement.

2. The invention as set forth in claim 1 wherein the bottom of the hopper is in the form of a basin of U-shape and the interconnecting conduit is of cylindrical shape with the lower portion of the interior surface aligned with the upper surface of the U-shaped basin.

3. In combination, a pair of load containing railway car hoppers adapted for pneumatic unloading, said hoppers being disposed in transversely aligned relation, means providing a vacuum chamber in the lower portion of each hopper formed in part by an inverted U-shaped hood member and a lower basin structure separated from the hood member a sufficient distance to provide openings for the flow of lading by gravity from the hopper into the chamber, conduit means connecting the aligned hoppers, and means for selectively withdrawing lading from one of the hoppers to the exclusion of the other, said means including a suction tube having a length sufficient to span the openings into the vacuum chamber of only one of said hoppers to block the openings of the excluded hopper while permitting the withdrawal of lading through said suction tube from the companion hopper through its openings, and means on each hopper for receiving said suction tube for such endwise movement.

4. The invention as set forth in claim 3 wherein the walls of the inverted U-shaped hood member and the lower surface of the basin structure form a three point locating and guiding means for the withdrawing tube.

5. For combination with a pair of hoppers containing finely divided lading, each hopper being formed by downwardly extending walls defining a discharge opening, a generally U-shaped basin member closed at the ends and adapted to be secured to each hopper to form the bottom thereof, an inverted generally U-shaped hood overlying each basin member with its lower edges spaced from the upper surfaces of the respective sides thereof and forming therewith a vacuum chamber into which lading can flow from the respective hopper through the longitudinally extending slots therebetween, conduit means interconnecting the vacuum chambers associated with said hoppers, means providing a fluid inlet to one of said vacuum chambers and through said conduit means to the other vacuum chamber, means providing a fluid and lading outlet from said other vacuum chamber and through said conduit means to said one vacuum chamber, and means for selectively withdrawing lading from one of said hoppers to the exclusion of the other hopper including a suction tube having a length sufficient to span only the vacuum chamber of said other hopper and insertable through said outlet to prevent the flow of lading into the vacuum chamber of said other hopper while permitting withdrawal therethrough of lading from the vacuum chamber of said one hopper.

6. For combination with a pair of hoppers containing finely divided lading, each hopper being formed by downwardly extending walls defining a discharge opening, a generally U-shaped basin member closed at the ends and adapted to be secured to each hopper to form the bottom thereof, an inverted generally U-shaped hood overlying each basin member with its lower edges spaced from the upper surface of the respective sides thereof and forming therewith a vacuum chamber into which lading can flow from the respective hopper through the longitudinally extending slots therebetween, conduit means interconnecting the vacuum chambers associated with said hoppers, means providing a fluid inlet to one of said vacuum chambers and through said conduit means to the other vacuum chamber, means providing a fluid and lading outlet from said other vacuum chamber and through said conduit means to said one vacuum chamber, and means for selectively withdrawing lading from one of said hoppers to the exclusion of the other hopper including a suction tube having a length sufficient to span only the vacuum chamber of said other hopper and insertable through said outlet to prevent the flow of lading into the vacuum chamber of said other hopper while permitting withdrawal therethrough of lading from the vacuum chamber of said one hopper, the lowermost inner surface portion of said conduit means constituting an endwise extension of the lowermost inner surface portions of said U-shaped basins whereby on application of suction to either end of said conduit means lading is drawn from the vacuum chamber at the other end thereof.

7. A pair of spaced apart hoppers for finely divided lading each formed by downwardly extending walls defining a discharge opening closed by a generally U-shaped basin member closed at its ends and providing the bottom of each hopper, the basin members of said hoppers being disposed in endwise alignment, an inverted U-shaped hood overlying each basin member with its lower edges spaced from the upper surfaces of the respective sides thereof and forming therewith a vacuum chamber into which lading can flow from the respective hopper through the longitudinally extending slots therebetween, conduit means interconnecting adjacent ends of the vacuum chambers, means providing a fluid inlet to the other end of one of said vacuum chambers and through said conduit means to the other vacuum chamber, means providing a fluid and lading outlet from the other end of the other vacuum chamber and through said conduit means to said one vacuum chamber, and means for selectively withdrawing lading from one of said hoppers to the exclusion of the other hopper including a suction tube having a length sufficient to span only the ends of the basin member of said other hopper and insertable through said fluid and lading outlet into the juxtaposed end of said conduit means to prevent the flow of lading into the basin member of said other hopper while permitting withdrawal therethrough of lading from the basin member of said one hopper.

8. A pair of spaced apart hoppers for finely divided lading each formed by downwardly extending walls defining a discharge opening closed by a generally U-shaped basin member closed at its ends and providing the bottom of each hopper, the basin members of said hoppers being disposed in endwise alignment, an inverted U-shaped hood overlying each basin member with its lower edges spaced from the upper surfaces of the respective sides thereof and forming therewith a vacuum chamber into which lading can flow from the respective hopper through the longitudinally extending slots therebetween, conduit means interconnecting adjacent ends of the vacuum chambers, means providing a fluid inlet to the other end of one of said vacuum chambers and through said conduit means to the other vacuum chamber, means providing a fluid and lading outlet from the other end of the other vacuum chamber and through said conduit means to said one vacuum chamber, and means for selectively withdrawing lading from one of said hoppers to the exclusion of the other hopper including a suction tube having a length sufficient to span only the vacuum chamber of said other hopper and insertable through said outlet to prevent the flow of lading into the vacuum chamber of said other hopper while permitting withdrawal therethrough of lading from the vacuum chamber of said one hopper, the lowermost inner surface portion of said conduit means being a coplanar endwise extension of the lowermost inner surface portions of said U-shaped basins whereby on application of suction to either end of said conduit means lading is drawn from the vacuum chamber at its other end.

References Cited in the file of this patent

UNITED STATES PATENTS

| | | |
|---|---|---|
| 2,650,726 | Aller | Sept. 1, 1953 |
| 2,941,842 | Wishaw | June 21, 1960 |